March 15, 1960 J. H. TEAF 2,928,283

TUNER

Filed Oct. 14, 1957 2 Sheets-Sheet 1

INVENTOR.

JOHN H. TEAF

BY Busser, Smith & Harding

ATTORNEYS

March 15, 1960 J. H. TEAF 2,928,283

TUNER

Filed Oct. 14, 1957 2 Sheets-Sheet 2

INVENTOR.

JOHN H. TEAF

BY

Busser, Smith & Harding

ATTORNEYS

United States Patent Office 2,928,283
Patented Mar. 15, 1960

2,928,283

TUNER

John H. Teaf, Merchantville, N.J., assignor to Radio Condenser Company, Camden, N.J., a corporation of New Jersey Application October 14, 1957, Serial No. 690,055

10 Claims. (Cl. 74—10.33)

This invention relates to push button tuners of the type used for tuning radio receiving sets, particularly those involved in automobiles.

The present invention has as its objects the improvement of such tuners to secure higher reliability of proper operation and accuracy of tuning. Tuners of the type involved are necessarily mass produced mechanisms largely constituted by stamped sheet metal parts but nevertheless require precise characteristics of operation since only minute deviations represent differences between satisfactory tuning and unsatisfactory tuning of received signals.

In the usual form of such tuner variable inductance tuning is involved attained by the positioning of magnetic cores within coils forming variable inductances in the tuning circuits of a receiver. The entire range of movement of the cores is necessarily limited by space and operation considerations and nevertheless the range of tuning adjustment must cover the entire broadcast band in conventional automobile receivers. Since the receivers to be satisfactory must be highly selective, it is evident that to secure repeated tuning of particular stations the push button tuning means must very precisely position the cores in each operation. Play of parts must accordingly be reduced to a very small amount.

In my Patent 2,301,090, dated November 3, 1942, there is disclosed in Figures 1 and 2 a push button assembly which has been widely used in push button tuners. This slide assembly involves one slide member carrying an adjustable cam engageable with a treadle bar the angular position of which determines the tuning position of the variable reactors, which may be either variable condensers or variable inductances, the latter being primarily used at the present time. A second slide member is movable relative to the first. When the second slide member is withdrawn outwardly relative to the first, the adjustable cam is free to oscillate and under such condition the resetting of a slide assembly takes place by manual adjustment of the treadle bar followed by inward movement imparted to the push button which results, sequentially, in first bringing the cam into engagement with the treadle bar, whereby the cam is positioned, and then by relative movement of the two slide members an action of the locking lever mounted on the first member into tight clamping engagement with the cam. The two slides are then together moved outwardly by spring action upon release of the push button with the result that each time the slide assembly is again moved inwardly the locked cam will oscillate the treadle bar to the position corresponding to the setting attained.

While the assembly shown in said patent has been highly satisfactory, there are certain unusual circumstances which may give rise to misoperation.

For example, if friction restrains proper sliding movement of the first mentioned slide member, the attempt to effect resetting may involve a premature relative movement of the second slide member relative to the first with the result that locking of the cam may occur before the cam attains its final position which should be determined by the manually adjusted treadle bar with the result that the attempted resetting will be unsuccessful by reason of movement of the treadle bar by the cam. Accordingly, it is desirable to have some resistance offered to initiation of movement of the second member relative to the first to make more certain their moving together until the cam reaches its final position.

The second possible trouble is that due to excessive vibration there may be outward movement of the second mentioned slide member sufficient to release the cam with the result that tuning by an inward movement of the slide assembly will be unsuccessful. Even slight undesired displacement of the parts due to the above misoperations will be sufficient to defeat proper tuning.

In accordance with my application, Serial No. 621,136, filed November 8, 1956, various of the troubles indicated above are eliminated through the use of means latching the slide members releasably in their respective critical relationships.

In accordance with the present invention, a further possible difficulty in securing consistent repetition of accurate tuning is avoided while retaining the advantages of what is disclosed in said application, Serial No. 621,136. In the arrangement of said application, the finger of the operator in moving the slide members inwardly acts directly on one of them so that the assembled pair is to some extent dependent upon the directional force exerted by the operator's finger. Necessarily the slide assembly must have for its free operation some clearances, even though slight, in the guiding portions of the frame with the result that the angle of the locked cam may be slightly changed and correspondingly may change the angle to which the treadle bar is set. In accordance with the present invention, therefore, there is provided a third slide member which, irrespective of tilting of itself by the finger of an operator will always exert a particular direction of force on the slide member which in the previous arrangement was subject to movement by the operator's finger. The result, then, is that irrespective of the direction of the force exerted by the finger, the slide assembly which mounts the operating locked cam will take a definite position when the treadle bar is engaged to effect tuning. The same is true during adjustment of the cam by the treadle bar which has been located in a position to tune a particular frequency. Thus, the setting of the cam will always position the treadle bar to a high degree of accuracy in conformity with the frequencies chosen for tuning.

The attainment of the foregoing is the general object of the present invention, and this object as well as others concerned with certain details of construction and operation will become apparent from the following description read in conjunction with the accompanying drawings in which.

Figure 1:
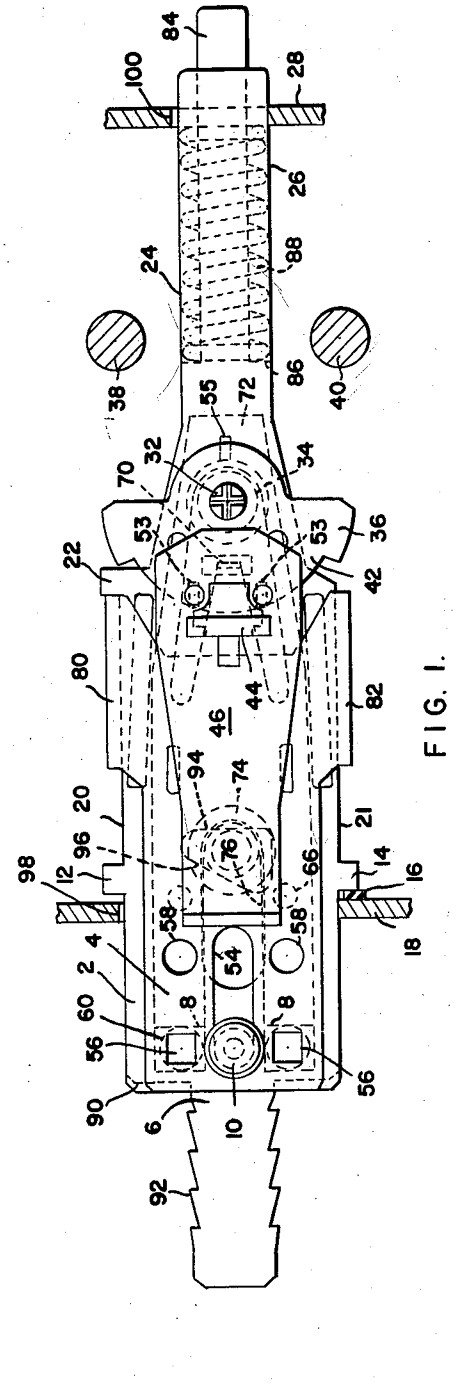
Figure 1 is a side elevation of a slide assembly provided in accordance with the invention, portions of the mounting means and the adjustable treadle being shown in section.
Figure 2:
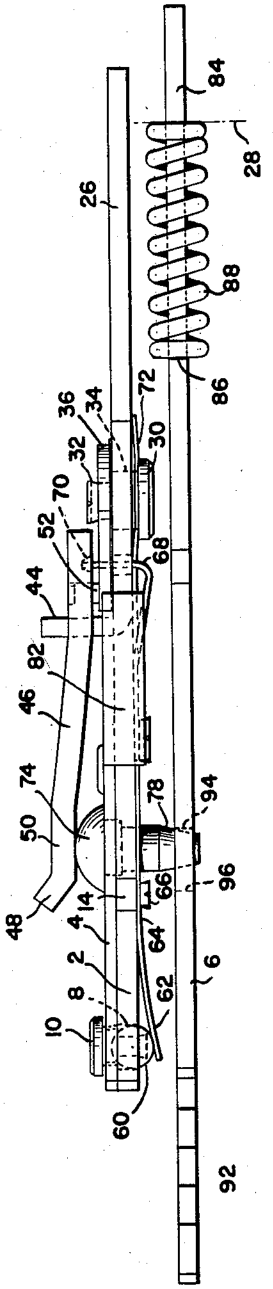
Figure 2 is a plan view looking upwardly at the bottom of Figure 1.

Referring first to Figures 1 and 2, there is indicated at 2 a main slide member which provides, in particular, the mounting for a setting cam engageable with a treadle bar and the locking lever for the cam, as well as for the mounting of other elements. It is this slide member which, for repeatability of tuning actions, must be accurately positioned in each resetting and tuning operation. Associated with this is a second slide member 4 which may be referred to as the locking slide member since its movement relative to the slide member 2 effects the locking or unlocking of the cam. In prior constructions, the slide member corresponding to 4 was that which was directly manually operable by means of a push button.

In accordance with the present invention a third slide member 6, which may be conveniently referred to as the actuating slide member, is provided, this being the slide member which is manually manipulated.

Referring first to the main slide member 2, this is provided with a pair of rectangular openings 8 adjacent to its forward end, these openings being elongated in a direction transverse to the slide member. Between these openings a rivet 10 is secured in the slide member 2. Ears 12 and 14 project from the upper and lower edges of the slide member 2 to prevent the slide member from moving forwardly relative to a transverse portion 18 of the frame through which the slide members pass. Desirably a rubber bumper 16 is provided to be engageable by ear 14 to minimize shock and noise when the slide assembly moves forwardly. Rearwardly of the ears 12 and 14 the slide member 2 is provided with parallel edges 20 and 21 which serve for the guidance of the locking slide member 4. An ear 22 limits relative rearward movement of the slide member 4 with respect to slide member 2. At its rear portion the slide member 2 is provided with an extension 24 which passes through a guide opening in a rear transverse plate 28 of the mounting frame. The plates 18 and 28 are provided with openings of the usual type adapted to restrain the slide member 2 to essentially straight line movement forwardly and backwardly, preventing any substantial lateral or tilting movement thereof. Clearances must, of course, be provided to permit free sliding movement, and these clearances, though small, involve the possibility of indefiniteness of positioning of the slide member 2. Clearances of this type are indicated in exaggerated form at 98 and 100. Similar lateral clearances are also necessarily involved.

A rivet 30 is secured at 32 in the cam member 36 and at 34 is pivoted in an opening in the main slide member 2. Desirably, this opening is of the tapered type shown and described in my application, Serial No. 621,136 so as to insure a definite position of the cam member 36 relative to the main slide member when in its operating position. The usual treadle bar is indicated by the cylindrical bars 38 and 40 engageable by the cam member 36, the treadle bar being rocked to adjust cores within coils for tuning purposes or, if condenser tuning is involved, the relationship of the rotor and stator plates. The mounting, construction, and connections of the treadle are not involved in the present invention.

The cam member 36 is provided with an arcuate portion which is arranged to be clamped to lock the cam member in position. For this purpose, the slide member 2 is provided with upstanding ear 44 provided with a T-head below which is engaged a lever 46, the head of the ear providing a fulcrum. The lever 46 at its forward end is provided with an outwardly diverted portion 48 succeeded by a portion 50 which, when the lever is in locking position, is substantially parallel to the plane of the slide member 2. At its portion to the rear of the fulcrum ear 44 the lever is provided with a pair of projections 52 arranged to engage the portion 42 of cam 36 to press the same against upward projections 43 of the main slide member. On the opposite side of the pivoting rivet 30 another projection 55 is provided so that locking of the cam member 36 occurs by its being pressed against the projections 53 and 55.

The locking slide member 4 is provided with a pair of square openings 56 and with a pair of circular openings 58. Balls 60 are held within the openings 8 of the main slide member 2 and are pressed upwardly as viewed in Figure 2 by the leaves 62 of a spring 64 riveted to the main slide member at 66. The spring 64 is extended inwardly with a portion bent upwardly at 68 to engage in a socket 70 in the lever 46, the action being such that the spring will normally urge the lever toward a position to disengage the cam member 36. Another projecting portion 72 of the spring extends under the head of the rivet 30 to urge the rivet and the cam member 36 downwardly as viewed in Figure 2.

The balls 60 in combination with the openings 8, 56 and 58 function as follows:

When the parts are positioned as illustrated in Figures 1 and 2, the balls which have slight clearance in the openings 8 in the direction of extent of the slide members enter the square openings 56 to latch releasably the slide members 2 and 4 in the position illustrated. The transverse clearances of the balls in the openings 8 serve to permit transverse adjustments of the balls to provide proper seating in the openings 56. These openings are of such size that only relatively shallow seating of the balls therein occurs. The result is that little effort is required to move the slide member 4 relatively to the slide member 2 in a forward direction. When the movement is carried out to the extent of bringing the openings 58 into alignment with the balls 60 the balls seat more deeply in these circular openings to provide a more effective latching action thereby to prevent relative movements between the slide members unless considerable force is imparted to move the slide member 4 inwardly with respect to the slide member 2.

Secured in the locking slide member 4 is a rivet 74 having a rounded head which constitutes a cam acting on the lever 46. This rivet extends through a slot 76 in the main slide member 2. The end of the rivet is conically tapered as indicated at 78.

Flanges 80 and 82 are provided on the locking slide member 4 to provide a cross-head arrangement slidable on the edges 20 and 21 of the slide member 2, the arrangement being such that the slide members are constrained to substantially a linear relative movement in a direction parallel to the edges 20 and 21. The rivet 10 previously described by engagement over the edges of the slot 54 maintains the slide members 2 and 4 in general parallelism even when the slide members are in their relative positions effecting unlocking of the cam member 36.

The actuating slide member 6 is provided with an extension 84 guided in suitable slots in the rear frame plate 28 and is surrounded by a spring 88 reacting between the plate 28 and shoulders 86 on the slide member 6. At its forward end the member 6 is widened as indicated at 90 and is guided in suitable slots in the front frame plate 18. The extreme outer end of the actuating slide member 6 is serrated as indicated at 92 or otherwise formed to mount a conventional push button (not illustrated).

The slide member 6 is provided with a generally triangular opening indicated at 94 which opening has its rearward edge extending substantially transverse to the direction of movement of the slides but having its forward edge 96 extending at an acute angle with respect to this transverse direction. The edges of this opening are adapted to engage the conical portion 78 of the rivet 74.

The spring 88 is of such construction that it is almost fully extended less the lock-up deflection, and under only slight compression, when the various members occupy the normal rest position illustrated in Figures 1 and 2. This means that while the spring will ordinarily hold the assembly forward to the extent that the ear 14 engages the bumper 16, thereby preventing rattle of the parts, the spring will not serve to force the actuating slide member 6 further forwardly to disengage the rivet 74 from beneath the portion 50 of lever 46. Spring 88, when the slides are unlocked, has sufficient compression to impart slight forward return force to the tuning slide assembly.

The operation of what has been described is as follows: Starting from the position illustrated in Figure 2, let it be assumed that it is desired to readjust the slide assembly illustrated to tune a different frequency than that which it was previously adjusted to tune. It is, of course, understood that a number of these assemblies are arranged side by side to tune different frequencies, and the operation of one is similar to that of the others. Inasmuch as the cam 36, and the corresponding cams of other assemblies are free of the treadle bar, the usual manual knob tuning may be effected to tune a station of the desired frequency. When this has been accomplished, an outward pull is exerted on the push button carried by the slide member 6 and the slide member is thus moved forwardly. Since the slide member 2 will be arrested by the bumper 16, the action of the rear edge of the opening 94 on the rivet 74 will effect forward movement of the locking slide member 4, the latching action of the balls 60 being overcome. This outward movement is continued to a final position in which the openings 58 are aligned with the balls, the inner end of the slot 54 then engaging the rivet 10 to limit outward movement. The movement of the rivet 74 carries its head from beneath end 48 of lever 46 releasing this lever, the inner end of which is raised by the portion 68 of spring 64 to release the cam member 36.

The button is now pushed inwardly. The edge 96 of the opening 94 engages the tapered end 78 of rivet 74 and thereafter for a portion of the full stroke the three slide members move in unison by reason of the fact that the balls 60 are now well seated in the openings 58. As this movement continues the cam member 36 will engage one and then both of the treadle bars 38 and 40 being rocked thereby to an angular position corresponding to engagement with both. When this occurs the rivet 30 is seated in the tapered opening 34 and further rearward movement of the slide member 2 is prevented. As this condition is achieved, two actions occur at the point of engagement of the actuating slide member 6 and rivet 74. By reason of the taper 78 of the rivet, the main slide member 2 has imparted to it a lateral thrust, i.e., upwardly as viewed in Figure 2, to bring it into tight engagement with the sides of its guiding slots. Thus it transverse position is established to a high degree of accuracy. At the same time the slope of the edge 96 of the opening 94 imparts a downward component of thrust through the rivet 74 to the slide member 2 causing it to seat at the bottoms of its guiding slots in the plates 18 and 28 as viewed in Figure 1, causing all of the clearances to be definitely at the tops of the guiding slots as indicated at 98 and 100. The slide member 2 is thus very definitely and accurately positioned. The further thrust on the actuating slide member 6 will disengage the sockets 58 from the balls 60, an action which is resisted to a substantial extent by reason of the relatively strong latching action, and the locking slide 4 will then move forwardly relatively to the slide 2 causing the head of rivet 74 to ride under the portion 48 and then the portion 59 of the lever 46 to produce by cam action locking clamping of the cam member 36, the lever 46 being resilient to permit the clamping to be completed while at the same time permitting locking slide 4 to move to its full rearward position relative to main slide member 2 so that the balls 60 will enter the openings 56. Release of the push button will then result in the action of spring 88, which has in the meanwhile been compressed, to restore the entire slide assembly to its forward position.

If the treadle bar is thereafter moved to tune another frequency, either by the movement of another push button assembly or by manual knob control, it may be restored to the set frequency for the slide assembly just described by pushing inwardly on its push button. In this action the sloping edge 96 of opening 94 and the tapered end 78 of rivet 74 again come into action, the main slide member being forced to the same position in its guides as existed at the time of original setting of the cam member 36. The cam member has its conventional action, first engaging one of the treadle rods 38 or 40, with the slidable assembly coming to rest when the cam engages both. It will be evident that in view of the identical position of the main slide member during both the setting and the tuning operations, that the treadle bar will be accurately brought to the same position as existed during the setting of the cam member 36. Thus highly accurate tuning is effected.

Figure 3:
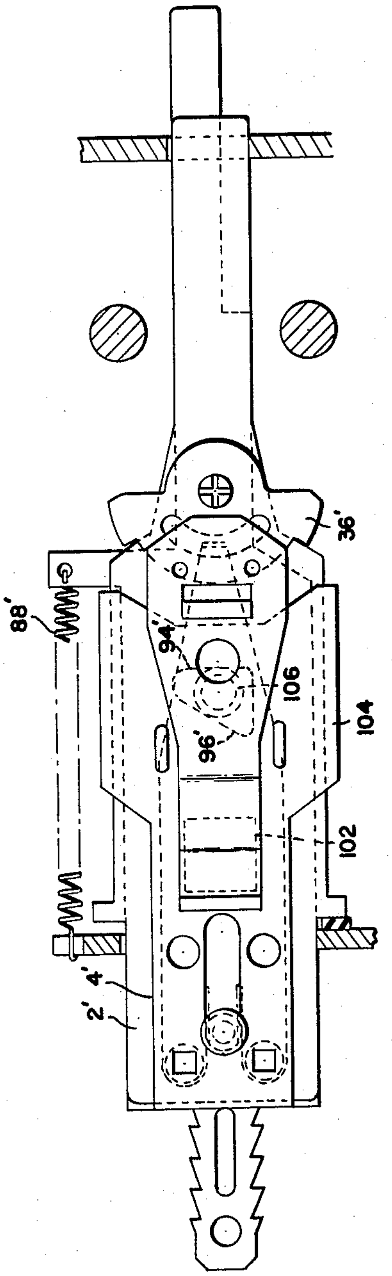
Figure 3 is a view similar to Figure 1 but showing a modified arrangement provided in accordance with the invention.
Figure 4:
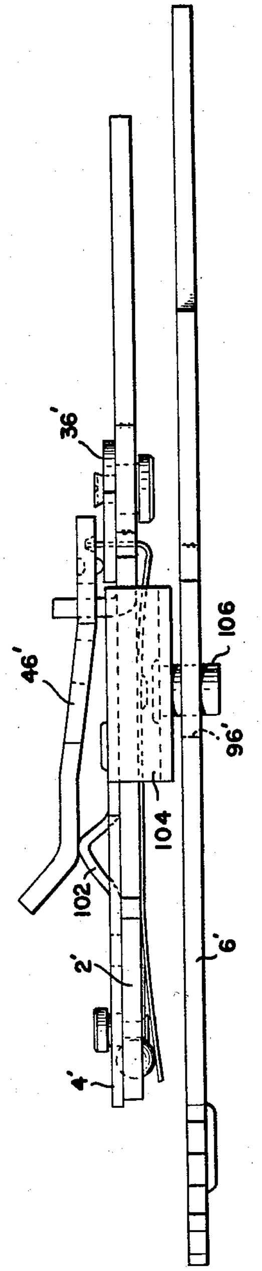
Figure 4 is a plan view looking upwardly at the bottom of Figure 3.

Figures 3 and 4 show a modified slide assembly which has substantially the same characteristics as that already described and hence need not be disclosed in its complete details. The parts which correspond to those in the modification shown in Figures 1 and 2 are designated by similar numerals with primes appended.

A main slide member 2', locking slide member 4' and actuating slide member 6' are mounted relative to each other and in the frame as previously outlined. The angularly adjustable cam 36' is arranged to be locked by the lever 46'. In this second modification, the lever 46' is acted upon by a cam element 102 provided by a diverted portion of the locking slide member 4'. This arrangement thus more nearly resembles what has been heretofore used. In view of the absence of a rivet such as 74 projecting through a slot in the main slide member, the locking slide member 4 is provided with a bracket arrangement embracing and extending across the face of the main slide member 2' to support a rivet 106 which projects through an opening in the actuating slide member 6' which has the same form as that in the slide 6, i.e., having a rear edge 94' extending transversely to the direction of slide assembly movements and a sloping cam edge 96'. As shown in Figure 4, rivet 106 is cylindrical, but it may be tapered in the same fashion as the tapered portion of the rivet 74. A tension spring 88' is here provided to effect normal forward position of the slide assembly instead of a compression spring as 88.

It will be evident that the operation is essentially similar to that of the first modification described. The only exception is that if the taper on the rivet is not provided, lateral thrust will not be exerted on the main slide member upon inward movement of the actuating slide member. This, however, is of minor significance. The cam edge 96' of the opening in the actuating slide member effects the same results as previously described in insuring that the main slide member has a definite position at the time either cam adjustment or tuning is effected.

It will be evident from the foregoing that the invention may be embodied in various ways, and accordingly the invention is not to be considered limited except as required by the following claims.

What is claimed is:

1. A tuner comprising a frame, a pivoted element, a slide assembly, and means mounting said slide assembly in the frame, said slide assembly comprising first, second and third slide members, said third slide member being guided in said frame independently of the first slide member, said third slide member having a portion arranged to carry a push button, a cam carried by the first of said slide members and arranged to engage said pivoted element, a lever carried by the first of said slide members and arranged to engage and clamp said cam, a second cam carried by the second of said slide members and arranged to engage said lever to clamp the first mentioned cam when said first and second slide members are in one relationship to each other and to release said lever to release the first mentioned cam when said first and second slide members are in another relationship to each other, and means interconnecting the first and third slide members to effect predetermined positioning of the first slide member relative to the frame upon exertion of manual force on said third slide member irrespective of variations in angular positions of said third slide member due to variations in the direction of manual forces applied thereto.

2. A tuner according to claim 1 in which the last mentioned means includes a cam and follower.

3. A tuner according to claim 1 in which the last mentioned means includes a pin carried by the second slide member arranged to be acted upon by a cam provided on the third slide member.

4. A tuner according to claim 3 in which said pin is tapered where it is acted upon by the last mentioned cam.

5. A tuner comprising a frame, a pivoted element, a slide assembly, and means mounting said slide assembly in the frame, said slide assembly comprising first, second and third slide members, said third slide member being guided in said frame independently of the first slide member, said third slide member having a portion arranged to carry a push button, a cam carried by the first of said slide members and arranged to engage said pivoted element, means carried by the first and second slide members to effect clamping of said cam when said first and second slide members are in one relationship to each other and to release said cam when said first and second slide members are in another relationship to each other, and means interconnecting the first and third slide members to effect predetermined positioning of the first slide member relative to the frame upon exertion of manual force on said third slide member irrespective of variations in angular positions of said third slide member due to variations in the direction of manual forces applied thereto.

6. A tuner according to claim 5 in which the last mentioned means includes a cam and follower.

7. A tuner according to claim 5 in which the last mentioned means includes a pin carried by the second slide member arranged to be acted upon by a cam provided on the third slide member.

8. A tuner according to claim 7 in which said pin is tapered where it is acted upon by the last mentioned cam.

9. A tuner comprising a frame, a pivoted element, an actuating assembly, and means mounting said actuating assembly in the frame, said assembly comprising first and second members, a cam carried by the first of said members and arranged to engage said pivoted element, means for selectively clamping or releasing said cam, and loosely interengaging cam and follower means interconnecting said first and second members to effect predetermined positioning of the first member relative to the frame upon exertion of manual force on said second member irrespective of variations in angular positions of said second member due to variations in the direction of manual forces applied thereto.

10. A tuner comprising a frame, a movable tuning control element, an actuating assembly, and means mounting said actuating assembly in the frame, said assembly comprising first and second members, a positionable element carried by the first of said members and arranged to position said tuning control element, and loosely interengaging cam and follower means interconnecting said first and second members to effect predetermined positioning of the first member relative to the frame upon exertion of manual force on said second member irrespective of variations in angular positions of said second member due to variations in the direction of manual forces applied thereto.

References Cited in the file of this patent

UNITED STATES PATENTS

| | | |
|---|---|---|
| 2,489,544 | Schwarz et al. | Nov. 29, 1949 |
| 2,659,236 | Allen | Nov. 17, 1953 |
| 2,820,366 | Spahman | Jan. 21, 1958 |